(12) United States Patent
Imai

(10) Patent No.: US 7,845,343 B2
(45) Date of Patent: Dec. 7, 2010

(54) FUEL INJECTION CONTROL DEVICE AND ENGINE CONTROL SYSTEM

(75) Inventor: Minoru Imai, Kariya (JP)

(73) Assignee: Denso Corporation, Kariya (JP)

( * ) Notice: Subject to any disclaimer, the term of this patent is extended or adjusted under 35 U.S.C. 154(b) by 409 days.

(21) Appl. No.: 12/136,982

(22) Filed: Jun. 11, 2008

(65) Prior Publication Data

US 2008/0308065 A1    Dec. 18, 2008

(30) Foreign Application Priority Data

Jun. 12, 2007    (JP) .............................. 2007-155623

(51) Int. Cl.
*F02D 41/30*    (2006.01)
*F02D 45/00*    (2006.01)
*F02D 41/38*    (2006.01)

(52) U.S. Cl. ..................... 123/674; 123/299; 123/198 F

(58) Field of Classification Search ................. 123/674, 123/299, 478, 480, 436, 198; 701/103–105
See application file for complete search history.

(56) References Cited

U.S. PATENT DOCUMENTS

| 6,397,585 | B2 * | 6/2002 | Kitajima et al. .............. 60/284 |
| 6,755,176 | B2 | 6/2004 | Takeuchi et al. |
| 6,907,861 | B2 | 6/2005 | Asano et al. |
| 7,275,525 | B2 * | 10/2007 | Miyasako et al. ........... 701/108 |
| 7,306,541 | B2 * | 12/2007 | Ogawa ....................... 477/107 |
| 2007/0015630 | A1 | 1/2007 | Miyazaki |

FOREIGN PATENT DOCUMENTS

| JP | 59-7743 A | * | 1/1984 |
| JP | 2006-125370 | | 5/2006 |

OTHER PUBLICATIONS

Japanese Office Action dated Apr. 17, 2009, issued in corresponding Japanese Application No. 2007-155623, with English translation.

* cited by examiner

*Primary Examiner*—Hieu T Vo
(74) *Attorney, Agent, or Firm*—Nixon & Vanderhye PC

(57) ABSTRACT

A fuel injection control device for performing injection control of an injector has a program for performing fuel injection of a predetermined injection quantity (a small quantity) with an injector based on establishment of a first permission condition during fuel cut of the engine and for acquiring a fuel injection quantity indicating a fuel injection characteristic of the injector and a program for performing fuel injection of a predetermined injection quantity (a small quantity) with the injector based on establishment of a second permission condition during idling of the engine and for acquiring a fuel injection quantity indicating the fuel injection characteristic of the injector. Thus, the fuel injection control device and an engine control system including the fuel injection control device can suitably sense the fuel injection characteristic of the injector.

22 Claims, 9 Drawing Sheets

COMPARATIVE EXAMPLE (RELATED ART)

| | RANGE A | RANGE B | RANGE C | RANGE D | RANGE E |
|---|---|---|---|---|---|
| LEARNING VALUE (CORRECTION COEFFICIENT) | | | | | |

(Pr = LOW) ←——————————→ (Pr = HIGH)

| | CYL #1 | CYL #2 | CYL #3 | CYL #4 |
|---|---|---|---|---|
| RANGE A | ○ | ○ | ○ | ○ |
| RANGE B | ○ | | | ○ |
| RANGE C | | ○ | | |
| RANGE D | | | | ○ |
| RANGE E | ○ | | | |

TRAVEL DISTANCE

FUEL INJECTION CONTROL DEVICE AND ENGINE CONTROL SYSTEM

CROSS REFERENCE TO RELATED APPLICATION

This application is based on and incorporates herein by reference Japanese Patent Application No. 2007-155623 filed on Jun. 12, 2007.

BACKGROUND OF THE INVENTION

1. Field of the Invention

The present invention relates to a fuel injection control device and an engine control system suitably used for learning a fuel injection characteristic at the time when injection supply of fuel to a target engine is performed.

2. Description of Related Art

As is well known, in an engine (specifically, an internal combustion engine) used as a motive power source of an automobile or the like, fuel injected and supplied with a suitable fuel injection valve (for example, an injector) is ignited and combusted in a combustion chamber in a predetermined cylinder to generate torque in a predetermined output shaft (a crankshaft). In recent years, a diesel engine for the automobile or the like has come to employ a multiple injection method of performing a main injection for generating output torque and also a subsidiary injection of an injection quantity (usually, a minute injection quantity) smaller than that of the main injection before or after the main injection in one combustion cycle. For example, today, inhibition of increase in a noise at the time of the fuel combustion and reduction of a NOx emission quantity are required. In order to respond to the requirements, in some cases, a pilot injection or a pre-injection of a small injection quantity is performed before the main injection. Further, in some cases, an after injection is performed (at timing near the main injection timing during fuel combustion) additionally after the main injection for the purpose of activation of a diffusion combustion, reduction of particulate matter emission and the like. Further, in some cases, a post-injection is performed (at timing largely later than the main injection timing after the end of the fuel combustion) for the purpose of increase of exhaust temperature, activation of a catalyst through supply of a reduction component, and the like. Recent engine control supplies the fuel to the engine in injection modes (injection patterns) suitable for various situations with one or arbitrary combination of the various kinds of the injections.

Generally, an individual difference is caused in the injector during a manufacturing process and the like. Therefore, when the injectors are produced through mass production, injection characteristics of the injectors do not necessarily coincide with each other. Therefore, a no small variation is inevitably caused in the quantity of the actually injected fuel even if the command value of the injection quantity (i.e., an injection period) for the injector is equalized. The injection quantity of the subsidiary injection (specifically, the pilot injection) is smaller than that of the main injection. Therefore, when a difference arises between the desired injection quantity and the actual injection quantity, the difference exerts a large influence. In such the case, there is a possibility that the above described purposes become difficult to achieve even if the difference is small.

Therefore, there has been proposed a device for compensating a characteristic error of the injector including an error resulting from a manufacture variation, aging and the like by sequentially learning the injection characteristic of the injector and by sequentially correcting (calibrating) the error (for example, as described in Patent document 1: JP-A-2005-36788). The device described in Patent document 1 performs a fuel injection (a single-shot injection) of a small injection quantity in a fuel cut period in deceleration of a vehicle. Thus, the device senses a behavior change (in more detail, an increase of rotation speed) of the engine output shaft due to the fuel injection. Also, the device calculates and stores (i.e., learns) the generated torque and eventually the fuel injection quantity based on the sensed rotation speed increase.

There is also a proposed device (as described in Patent document 2: JP-A-2003-254139) as a device that learns the injection characteristic of the injector. In order to control target rotation of the engine output shaft to target rotation speed through feedback control during the engine idling, the device divides a necessary fuel quantity (a required fuel quantity) required for the control of the target rotation into equal quantities (for example, 1 mm3/st each) and performs multiple injections (for example, five steps of injections). The device senses the fuel quantity of the one time of the injection (one injection) among the multiple times of the injections. The device learns the injection characteristic of the injector based on a difference between the sensing value of the fuel quantity (equivalent to the actual injection quantity) and a corresponding reference value. Thus, the injection characteristic of the subsidiary injection (the small quantity injection) can be sensed and stored (i.e., learned) as the injection characteristic of each injection by performing multiple times of the injections during one combustion cycle while securing torque necessary for the idling with the total injection quantity (for example, 5 mm3/st) of the multiple times of the injections.

However, when the inventor conducted the experiment and the like of the device described in each of Patent documents 1 and 2, the inventor acknowledged existence of some shortcomings and found that the device still has a margin for improvement.

SUMMARY OF THE INVENTION

It is an object of the present invention to provide a fuel injection control device and an engine control system capable of suitably sensing a fuel injection characteristic of an injector.

According to an aspect of the present invention, a fuel injection control device is applied to an engine that combusts fuel, which is supplied by a predetermined injector through an injection, in a predetermined cylinder to generate torque and that rotates an output shaft with the generated torque and controls an injection operation of the injector. The fuel injection control device has a first parameter acquisition device for performing fuel injection of a predetermined injection quantity (for example, a quantity corresponding to the pilot injection) with the injector based on establishment of a predetermined first permission condition during fuel cut of the engine (for example, fuel cut performed with deceleration subsequent to high-speed state) and for acquiring a first injection parameter indicating a fuel injection characteristic of the injector (for example, a relationship between an injection command and an actually injected fuel quantity). The fuel injection control device has a second parameter acquisition device for performing fuel injection of a predetermined injection quantity (for example, a small quantity) with the injector based on establishment of a predetermined second permission condition during idling of the engine and for acquiring a second injection parameter indicating the fuel injection characteristic of the injector.

By the experiment and the like, the inventor found that the securement of the learning opportunity (eventually, learning frequency) is difficult for the device that performs the learning by using the fuel cut period during the deceleration of the vehicle as described in Patent document 1. The inventor also found that, in the case of the device that performs the learning during the idling as described in Patent document 2, there is a possibility that the injection sound at the time when the injection is performed at high injection pressure turns into a noise and spoils conformable drive of the user. As contrasted thereto, in the control device according to the aspect of the present invention, the first parameter acquisition device and the second parameter acquisition device compensate the faults thereof mutually and produce a synergistic effect. Thus, the fuel injection characteristic of the injector can be sensed appropriately.

For example, the learning opportunity (and eventually learning frequency) can be increased by performing the learning in both of the fuel cut period and the idling period with the first parameter acquisition device and the second parameter acquisition device. In this case, by performing the learning of the fuel injection characteristic related to the high injection pressure during the fuel cut period, the above-mentioned noise resulting from the high-pressure injection during the idling period can be avoided.

Furthermore, for example, the fuel injection characteristic may be sensed under the same situation with both of the first parameter acquisition device and the second parameter acquisition device. Then, an average value of the sensing values may be used or the sensing value having the higher reliability may be used. Thus, the learning accuracy can be improved.

The fuel injection characteristic of the injector can also be sensed from a sensor output by providing a fuel pressure sensor near the injector. However, in the case of application to a general engine system, following structure is effective.

That is, according to another aspect of the present invention, the first parameter acquisition device performs the fuel injection and calculates a fuel injection quantity as the first injection parameter based on a change in a behavior of the engine output shaft (for example, an increase amount in the rotation speed or a change in a transition wave shape) caused by the fuel injection. The second parameter acquisition device performs the fuel injection and calculates a fuel injection quantity as the second injection parameter based on a change in a behavior of the engine output shaft caused by the fuel injection.

With such the construction, based on the change in the behavior of the engine output shaft caused by execution of the injection as the sensing target, the fuel injection quantity (equivalent to the fuel injection characteristic) of the injection can be sensed easily and appropriately in the manner similar to that of the device described in Patent document 1 or 2.

According to another aspect of the present invention, the second parameter acquisition device performs multiple times (stages) of the fuel injections (multiple times of injections of the same injection quantity, for example) during one combustion cycle based on the establishment of the predetermined second permission condition during the idling of the engine and calculates the fuel injection quantity as the second injection parameter based on a change in the behavior of the engine output shaft caused by the entire fuel injections.

Thus, by performing multiple times (for example, five times) of the injections during one combustion cycle, torque necessary for the idling can be secured with the total injection quantity (for example, 5 mm3/st) of the multiple times of the injections. When the injection characteristic is sensed, by sensing the injection characteristic of one of the injections, the injection characteristic concerning the injection (e.g., subsidiary injection) of the small quantity (for example, 1 mm3/st) can be suitably sensed.

According to another aspect of the present invention, the fuel injection control device further has a first parameter storing device for storing a value of the first injection parameter acquired by the first parameter acquisition device in a predetermined storage device while relating the value to each situation defined by one or more contents of one or more specific parameters consisting of one or more predetermined parameters indicating each situation (for example, the state of the engine or the vehicle mounted with the engine). The fuel injection control device further has a second parameter storing device for storing a value of the second parameter acquired by the second parameter acquisition device while relating the value to each situation defined by the one or more contents of the one or more specific parameters in a predetermined storage device.

With such the construction, by storing the first injection parameter or the second injection parameter while relating the parameter to each situation, the parameter value corresponding to (suitable to) each situation can be read when each parameter is used.

In this case, generally, the fuel injection characteristic of the injector tends to change due to an injection pressure level. Therefore, following construction is effective.

That is, according to another aspect of the present invention, the one or more specific parameters include the injection pressure level of the injector. It is effective to employ the common rail pressure as the injection pressure level, for example.

According to another aspect of the present invention, a first situation and a second situation are defined in accordance with a magnitude of the injection pressure level of the injector. The first parameter acquisition device and the first parameter storing device preferentially store the first injection parameter for the first situation, in which the injection pressure level is higher than in the second situation. The second parameter acquisition device and the second parameter storing device preferentially store the second injection parameter for the second situation.

As mentioned above, if the fuel injection is performed in the situation (the first situation) where the injection pressure level is high during the idling period, there is a possibility that comfortable drive by the user is disturbed with a noise.

As contrasted thereto, the device of the above aspect of the present invention preferentially performs the sensing of the injection characteristic related to the situation (first situation) of the high injection pressure level in the fuel cut period and preferentially performs the sensing of the injection characteristic related to the situation (second situation) of the low injection pressure level in the idling period. Accordingly, with the above-described device, the possibility of generation of the noise resulting from the high-pressure injection during the idling period can be restricted to be low, while securing sufficient learning opportunity (eventually, learning frequency).

According to another aspect of the present invention, the second parameter acquisition device and the second parameter storing device do not store the first injection parameter for the first situation. Thus, the above-described noise can be surely prevented.

According to another aspect of the present invention, the first parameter acquisition device and the first parameter storing device start storing the first injection parameter for the second situation based on establishment of a predetermined condition when the storage of the first injection parameter for the first situation is completed.

With such the device, both of the fuel injection characteristics sensed during the fuel cut period and the idling period can be acquired and stored as the fuel injection characteristic under the situation (second situation) of the low injection pressure level. Therefore, the learning accuracy of the fuel injection characteristic can be improved by using an average value of the sensing values or by using the sensing value having the higher reliability.

In the control device, the first injection parameter and the second injection parameter indicating the fuel injection characteristic of the injector at each time are stored in the predetermined storage devices respectively by the first parameter storing device and the second parameter storing device.

Therefore, according to another aspect of the present invention, the fuel injection control device has a diagnosing device for diagnosing existences nonexistence of an abnormality in the injector based on the first injection parameter and the second injection parameter stored in the predetermined storage devices respectively by the first parameter storing device and the second parameter storing device. Thus, the existence/nonexistence of the abnormality in the injector can be diagnosed easily and appropriately.

In the control device, the first injection parameter and the second injection parameter indicating the fuel injection characteristic of the injector at each time are obtained.

Therefore, according to another aspect of the present invention, the fuel injection control device further has an injection characteristic error derivation device for calculating an error of the fuel injection characteristic of the injector by comparing the first injection parameter acquired by the first parameter acquisition device or the second injection parameter acquired by the second parameter acquisition device with a corresponding reference value.

In this case, according to another aspect of the present invention, the fuel injection control device further has a correction device for correcting the fuel injection characteristic of the injector based on the error of the fuel injection characteristic calculated by the injection characteristic error derivation device.

Thus, the injection characteristic error can be sensed and the injection characteristic can be corrected easily and appropriately.

In certain type of industry, use or the like, the fuel injection control device can be handled in the form of an engine control system further including other related devices (for example, various control-related devices such as sensors and actuators) when the fuel injection control device is used in a unit larger than the unit of the fuel injection control device, for example, in the case where the fuel injection control device is used for engine control. It is anticipated that the above-described device is built in the engine control system and used.

Therefore, according to yet another aspect of the present invention, an engine control system has the above-described fuel injection control device, the injector as an application target of the fuel injection control device, and an engine control device for performing predetermined control related to the engine (such as torque control or rotation speed control of the engine output shaft) based on the operation of the injector.

Thus, the above described fuel injection control device is effectively built in the engine control system and used.

BRIEF DESCRIPTION OF THE DRAWINGS

Features and advantages of an embodiment will be appreciated, as well as methods of operation and the function of the related parts, from a study of the following detailed description, the appended claims, and the drawings, all of which form a part of this application. In the drawings:

DETAILED DESCRIPTION OF EXAMPLE EMBODIMENT

Hereinafter, a fuel injection control device and an engine control system according to an embodiment of the present invention will be described with reference to the drawings. The fuel injection control system according to the present embodiment is a common rail fuel injection control system (a high-pressure fuel supply system). The fuel injection control device according to the present embodiment is a fuel injection control device for a diesel engine. The fuel injection control device is mounted in the system and used when injection supply (direct injection supply) of high-pressure fuel directly into a combustion chamber in a cylinder of the diesel engine is performed.

First, with reference to FIG. 1, an outline of the common rail type fuel injection control system (an engine control system) according to the present embodiment will be explained. It is assumed that the engine according to the present embodiment is a multi-cylinder engine (for example, an in-line four-cylinder engine) mounted in a four-wheel vehicle (for example, an automatic transmission car). This engine is a four-stroke (four piston-stroke) reciprocating diesel engine (an internal combustion engine) that rotates an output shaft (a crankshaft 41 shown in FIG. 1) by converting an energy generated by combustion of the fuel into rotary motion. In the engine, a cylinder as a target cylinder at the time is sequentially determined by a cylinder determination sensor (an electromagnetic pickup) provided to a camshaft of the a suction valve or an exhaust valve. In each of the four cylinders #1-#4, a combustion cycle consisting of four strokes of an intake stroke, a compression stroke, a combustion stroke, and an exhaustion stroke is sequentially performed in the order of the cylinders #1, #3, #4, and #2 in the cycle of 720° CA, and in more detail, while the combustion cycles are deviated from each other by 180° CA among the respective cylinders. Injectors 20 shown in FIG. 1 are injectors for the cylinders #1, #2, #3, and #4 in this order from a fuel tank 10 side.

Figure 1:
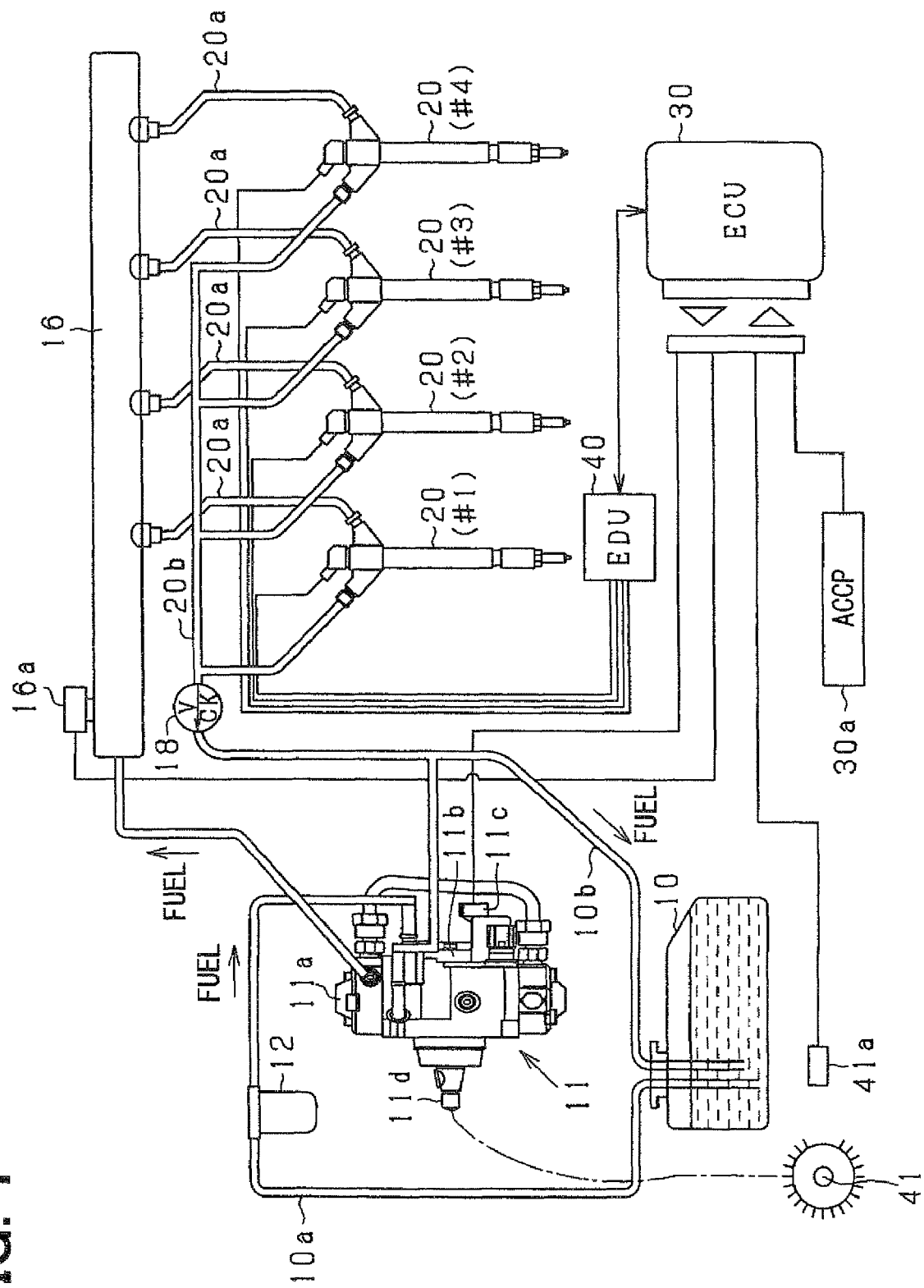
FIG. 1 is a schematic diagram showing a fuel injection control device and an engine control system including the fuel injection control device according to an embodiment of the present invention.

As shown in FIG. 1, generally, the system is structured such that an ECU 30 (an electronic control unit) takes in sensor outputs (sensing results) from various sensors and controls drive of respective devices constituting a fuel supply system based on the respective sensor outputs. The ECU 30 adjusts a current supply quantity to a suction control valve 11c, thereby controlling a fuel discharge quantity of a fuel pump 11 to a desired value. Thus, the ECU 30 performs feedback control (for example, PID control) for conforming fuel pressure in a common rail 16 (current fuel pressure measured with a fuel pressure sensor 16a) to a target value (target fuel pressure). The ECU 30 controls a fuel injection quantity for a predetermined cylinder of the target engine and eventually an output of the engine (i.e., rotation speed or torque of an output shaft) of the target engine to desired magnitudes.

The devices constituting the fuel supply system include the fuel tank 10, the fuel pump 11, the common rail 16, and the injectors 20 in this order from a fuel upstream side. Among the devices, the fuel tank 10 and the fuel pump 11 are connected by a pipe 10a via a fuel filter 12.

In such the fuel supply system, the fuel tank 10 is a tank (a vessel) for storing the fuel (light oil) of the target engine. A fuel gauge (not shown) is provided in the fuel tank 10 to enable measurement of the quantity of the fuel remaining in the fuel tank 10. The fuel pump 11 has a high-pressure pump 11a and a low-pressure pump 11b. The fuel pump 11 is structured such that the high-pressure pump 11a pressurizes and discharges the fuel drawn by the low-pressure pump 11b from the fuel tank 10. The suction control valve 11c (SCV) is provided to a fuel suction side of the fuel pump 11 for metering a fuel pumping quantity sent to the high-pressure pump 11a and the eventual fuel discharge quantity of the fuel pump 11. The fuel pump 11 can control the fuel discharge quantity from the pump 11 by regulating the drive current (eventually, an opening degree) of the suction control valve 11c to a desired value. For example, the suction control valve 11c is a normally-on type valve that opens when de-energized.

The low-pressure pump 11b out of the two kinds of pumps constituting the fuel pump 11 is constituted as a trochoid feed pump, for example. The high-pressure pump 11a consists of a plunger pump for example. The high-pressure pump 11a is structured to be able to sequentially pump the fuel, which is sent to pressurization chambers, at predetermined timing by reciprocating predetermined plungers (for example, three plungers) in axial directions thereof with an eccentric cam (not shown) respectively. Both of the pumps 11a, 11b are driven by a drive shaft 11d. The drive shaft 11d is interlocked with the crankshaft 41 as the output shaft of the target engine and rotates at a ratio of 1/1, 1/2 or the like to one revolution of the crankshaft 41. That is, the low-pressure pump 11b and the high-pressure pump 11a are driven by an output of the target engine.

The fuel drawn by the fuel pump 11 from the fuel tank 10 through the fuel filter 12 is pressure-fed (pumped) to the common rail 16 as a pressure accumulation pipe. Subsequently, the fuel is pressurized within the common rail 16 to predetermined fuel pressure (for example, pressure equal to or higher than 1000 atmospheres), and is distributed (supplied) to the injectors 20 of the respective cylinders #1-#4 through pipes 20a (high-pressure fuel passages) provided for the respective cylinders. A fuel pressure sensor 16a for sensing the fuel pressure (rail pressure) in the common rail 16 is provided to the common rail 16 for enabling sensing and management of the rail pressure correlated with fuel injection pressure of the injector 20. Pipes 20b are connected to fuel outlets of the respective injectors 20. The pipes 20b converge into a single pipe and are connected with a pipe 10b for returning the fuel to the fuel tank 10 through a pressure reducing valve 18 (a back pressure regulating valve). The pressure reducing valve 18 is for lowering the pressure of the fuel in deceleration of a vehicle and the like.

Figure 2:
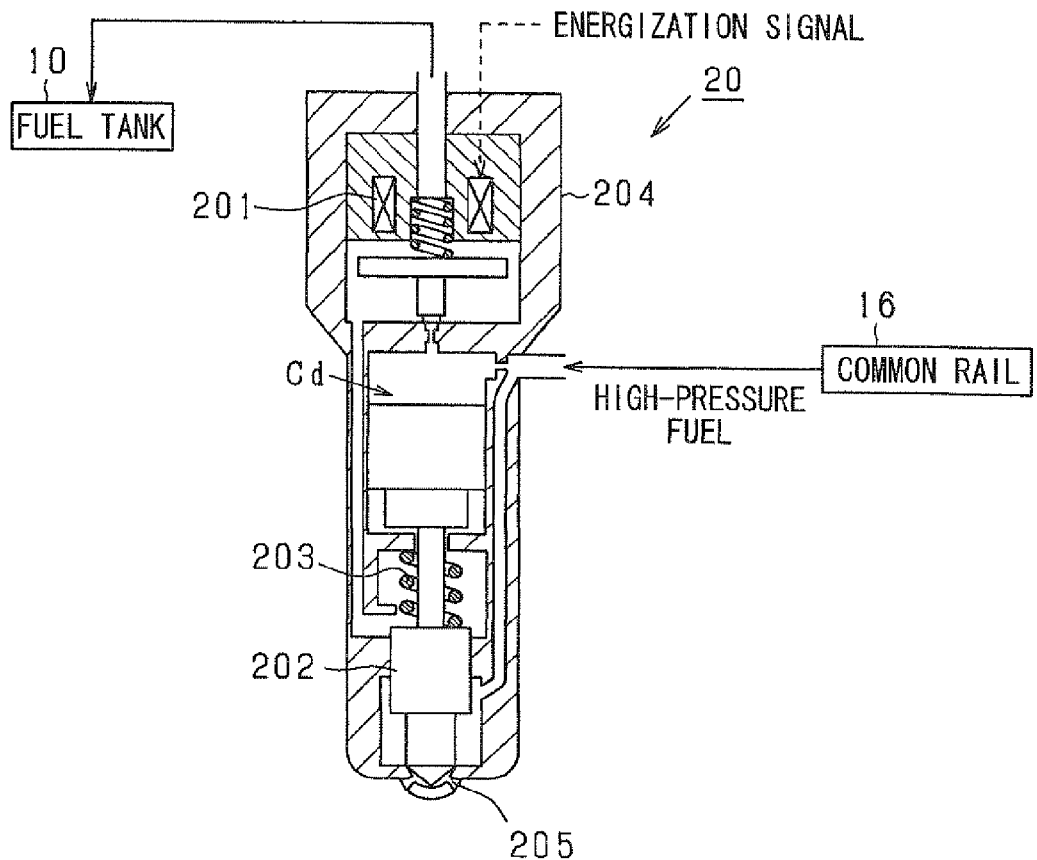
FIG. 2 is a cross-sectional diagram showing an injector used in the system according to the embodiment.

A detailed structure of the injector 20 is shown in FIG. 2. The injector 20 according to the present embodiment is of a hydraulic drive type using the engine fuel for combustion (i.e., the fuel in the fuel tank 10). In the injector 20, a driving power for the fuel injection is transmitted through an oil pressure chamber (i.e., a command chamber).

As shown in FIG. 2, the injector 20 is a fuel injection valve of an inner valve opening type. The injector 20 is structured as a fuel injection valve of a normally-closed type that is brought to a valve-closed state when de-energized. In the injector 20, a sealed degree of an oil pressure chamber Cd and eventually pressure in the oil pressure chamber Cd (equivalent to back pressure of a needle 202) are increased/decreased in accordance with an energized state (energization/de-energization) of a solenoid 201 constituting a two-way electromagnetic valve. Due to the increase/decrease in the pressure, the needle 202 reciprocates (moves upward and downward) inside a valve cylinder (i.e., inside a housing 204) along with or against an extensional force of a spring 203 (a coil spring) (i.e., an elastic force of the spring 203 to extend). Accordingly, a fuel supply passage to injection holes 205 (necessary number of which are bored) is opened and closed at a halfway thereof (in more detail, at a tapered seat face, which the needle 202 is seated on and separated from in accordance with the reciprocating movement thereof). The drive control of the needle 202 is performed by PWM (Pulse Width Modulation) control. A pulse signal (an energization signal) is sent from the ECU 30 to the drive section (the two-way electromagnetic valve) of the needle 202. A lift amount of the needle 202 (a separating degree from the seat face) is variably controlled based on pulse width of the pulse signal (equivalent to an energization period). In the control, the lift amount increases as the energization period lengthens, and an injection rate (i.e., a fuel quantity injected per unit time) increases as the lift amount increases. The pressure increase processing of the oil pressure chamber Cd is performed by the fuel supply from the common rail 16. Pressure reduction processing of the oil pressure chamber Cd is performed by returning the fuel in the oil pressure chamber Cd to the fuel tank 10 through a pipe (not shown) connecting the injector 20 and the fuel tank 10.

Thus, the injector 20 has the needle 202 that performs valve opening and valve closing of the injector 20 by opening and closing (blocking) the fuel supply passage extending to the injection holes 205 through a predetermined reciprocating movement inside the valve body (i.e., the housing 204). In a non-driven state, the needle 202 is displaced in a valve-closing direction by a force (an extensional force of the spring 203) constantly applied in the valve-closing direction. In a driven state, the needle 202 is applied with a driving force, so the needle 202 is displaced in a valve-opening direction against the extensional force of the spring 203. In this case, the lift amount of the needle 202 changes substantially symmetrically between the non-driven state and the driven state.

In the target engine, the injection supply of the necessary quantity of the fuel is sequentially performed to each cylinder through the valve opening drive of the injector 20. During an operation of the engine, an intake air is introduced from an intake pipe to the combustion chamber of the cylinder by an opening operation of the suction valve and is mixed with the fuel supplied from the injector 20 through the injection (i.e., the direct injection). The thus produced fuel-air mixture is compressed by a piston in the cylinder and ignites (by self-ignition) and combusts. The exhaust gas produced through the combustion is discharged to an exhaust pipe by an opening operation of the exhaust valve.

In addition to the above-described sensors, various sensors for vehicle control are provided in a vehicle (not shown). For example, a crank angle sensor 41a (for example, an electromagnetic pickup) that outputs a crank angle signal at every crank angle (for example, in the cycle of 30° CA) is provided to an outer periphery of the crankshaft 41 as the output shaft of the target engine to sense a rotational angle position of the crankshaft 41, the rotation speed of the crankshaft 41 (i.e., engine rotation speed), and the like. An accelerator sensor 30a that outputs an electric signal corresponding to a state (i.e., a displacement amount) of an accelerator is provided to the accelerator (i.e., an operation section) to sense an operation amount ACCP (i.e., a pressed amount) of the accelerator by the driver.

In such the system, it is the ECU 30 that functions as the fuel injection control device according to the present embodiment and that mainly performs the engine control as an electronic control unit. The ECU 30 (engine control ECU) has a well-known microcomputer (not shown). The ECU 30 grasps the operation state of the target engine and requests from the user based on the sensing signals of the above-described various sensors and operates the various actuators such as the injectors 20 in accordance with the engine operation state and the requests. Thus, the ECU 30 performs various kinds of control concerning the engine in the optimum mode for the current situation. Fundamentally, the microcomputer mounted in the ECU 30 consists of various kinds of computing units, storage devices, signal processing devices, communication devices and the like such as a CPU (basic processing unit) for performing various kinds of computation, a RAM (random access memory) as a main memory for temporarily storing data in the process of the computation, results of the computation and the like, a ROM (read-only memory) as a program memory, an EEPROM (electrically rewritable non-volatile storage) as a memory for data storage, a backup RAM (RAM invariably supplied with power from a backup power supply such as an in-vehicle battery), signal processing devices such as an A/D converter and a clock generation circuit, and input/output ports for inputting/outputting the signals from/to the exterior. Various kinds of programs, control maps and the like concerning the engine control including a program concerning the fuel injection control are beforehand stored in the ROM, Various kinds of control data including design data of the target engine are beforehand stored in the memory for data storage (for example, the EEPROM).

An EDU 40 (a driver unit) applies high voltage to the injector 20 based on a command signal from the ECU 30. Because such the high voltage is applied to the injector 20, the injector 20 can operate at high speed. In more detail, the EDU 40 has a high voltage generation unit (for example, a DC-DC converter) and converts battery voltage applied by the in-vehicle battery into the high voltage with the high voltage generation unit. The EDU 40 applies the high voltage (i.e., a drive signal) to the predetermined injector based on the command from the ECU 30. At this time, if a circuit operation of the EDU 40 and an operation of the injector 20 are proper, an injection acknowledge signal indicating the properness is outputted to the ECU 30. If there is a certain fault, the injection acknowledge signal is not outputted. The ECU 30 continually supervises the fault in the EDU 40 or the injector 20 based on existence/nonexistence of the injection acknowledge signal.

In the present embodiment, the ECU 30 calculates torque (request torque) to be generated in the output shaft (the crankshaft 41) at the time and eventually a fuel injection quantity for satisfying the request torque based on the various kinds of the sequentially inputted sensor outputs (sensing signals). Thus, the ECU 30 variably sets the fuel injection quantity of the injector 20 to control indicated torque (generated torque) generated through the fuel combustion in the cylinder (the combustion chamber) and shaft torque (output torque) actually outputted to the output shaft (the crankshaft 41) (that is, the ECU 30 conforms the shaft torque to the request torque). The ECU 30 calculates the fuel injection quantity corresponding to the current engine operation state, the current operation amount of the accelerator by the driver and the like, for example. Then, the ECU 30 outputs an injection control signal (a drive amount) directing the fuel injection of the calculated fuel injection quantity to the injector 20 in synchronization with desired fuel injection timing. Thus, based on the drive amount of the injector 20 (for example, a valve opening period of the injector 20), the output torque of the engine is controlled to the target value.

Figure 3:
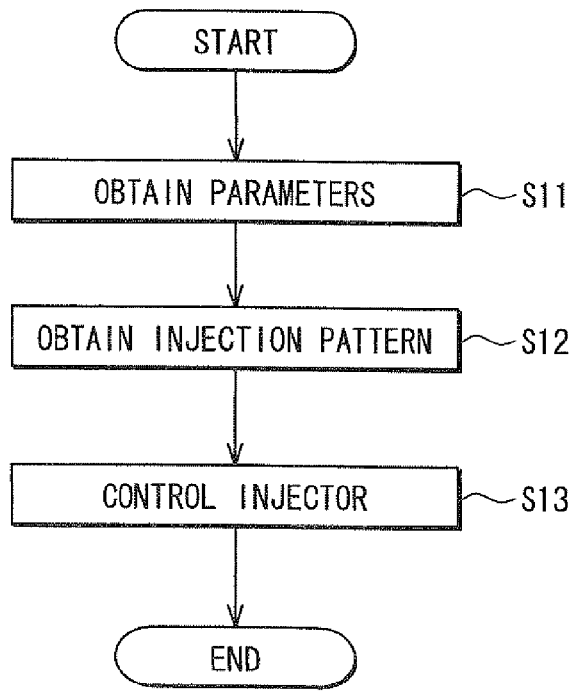
FIG. 3 is a flowchart showing a basic procedure of fuel injection control according to the embodiment.

As is well known, in the diesel engine, an intake throttle valve (a throttle) provided in an intake passage of the engine is held at a substantially fully-opened state during a steady operation in order to increase a fresh air quantity or to reduce a pumping loss. Therefore, control of the fuel injection quantity is a main part of combustion control during the steady operation (specifically, the combustion control concerning torque adjustment). Hereafter, a fundamental procedure of the fuel injection control according to the present embodiment will be explained with reference to FIG. 3. The values of the various parameters used in the processing shown in FIG. 3 are sequentially stored in the storage devices mounted in the ECU 30 such as the RAM, the EEPROM and the backup RAM and are updated at any time when necessary. Fundamentally, a series of processing shown in FIG. 3 is serially performed at a frequency of one time per combustion cycle for each cylinder of the target engine through execution of the program stored in the ROM by the ECU 30. That is, with the program, the fuel is supplied to all the cylinders except a dormant cylinder during one combustion cycle.

As shown in FIG. 3, first in S11 (S means "Steps") in a series of the processing, predetermined parameters such as the current engine rotation speed NE (i.e., an actual measurement value measured by the crank angle sensor 41a) and the rail pressure Pr (i.e., an actual measurement value measured by the fuel pressure sensor 16a) are read and also the accelerator operation amount ACCP (i.e., an actual measurement value measured by the accelerator sensor 30a) by the driver at the time and the like are read. Then, in following S12, an injection pattern is set based on the various parameters read in S11 (and also by separately calculating the request torque including losses due to external loads and the like when necessary). For example, an injection quantity (an injection period) of an injection in the case of a single injection or a total injection quantity (a total injection period) of injections contributing to the torque in the case of an injection pattern of multiple injection is variably set in accordance with the torque that should be generated in the output shaft (the crankshaft 41) (i.e., the request torque equivalent to the engine load at the time). Then, the command value (the command signal) for the injector 20 is set based on the injection pattern. Thus, pilot injection, pre-injection, after injection, post-injection, and the like are suitably performed with main injection in accordance with the situation of the vehicle and the like.

The injection pattern is obtained based on a predetermined basic injection map (a map or a mathematical expression for injection control) and a correction coefficient stored in the ROM, for example. In more detail, for example, the optimum injection pattern (adaptation values) is beforehand obtained by experiments and the like in anticipated ranges of the predetermined parameters (used in S11) and is written in the basic injection map. For example, the injection pattern is defined by parameters such as the number of injection stages (i.e., the time number of injections performed in one combustion cycle), fuel injection timings of the respective injections and the injection period (equivalent to the injection quantity). Thus, the basic injection map indicates the relationship between the parameters and the optimum injection pattern. The injection pattern obtained based on the map is corrected with the correction coefficient (stored in the EEPROM in the ECU 30, for example) that is separately updated (in a manner explained in more detail later). For example, a set value is calculated by dividing the map value by the correction coefficient. Thus, the injection pattern of the injection that should be performed at the time and eventually the command signal for the injector 20 corresponding to the injection pattern are acquired. When the injection pattern is set (in S12), maps set individually for the respective elements of the injection pattern (such as the number of the injection stages) may be used. Alternatively, maps, each of which is made for some collective elements of the injection pattern, or a map for all the elements of the injection pattern may be used when the injection pattern is set (in S12).

The thus set injection pattern or the eventual command value (the command signal) corresponding to the injection pattern are used in following S13. That is, the drive of the injector 20 is controlled in S13 based on the command value (the command signal), or in more detail, by outputting the command signal to the injector 20. After the drive control of the injector 20, the series of the processing shown in FIG. 3 is ended.

In the present embodiment, the fuel is supplied to the engine through such the fuel injection control. During the steady operation, prior to the main injection that mainly generates the output torque in one combustion cycle of the engine, a precedent subsidiary injection is performed by means of the pilot injection of a smaller injection quantity (for example, approximately 1 mm3/st) than the main injection. Thus, inhibition of a combustion noise and reduction of NOx are aimed at. Like the device described in Patent document 1 or 2, the combustion control device according to the present embodiment also sequentially learns an injection characteristic of the injector 20 (specifically, a relationship between the injection command concerning the pilot injection and the actually injected fuel quantity) and sequentially corrects (calibrates) an error Thus, the combustion control device according to the present embodiment compensates the characteristic error of the injector 20 including an error resulting from a manufacture variation, an aging, and the like. However, the fuel injection control device according to the present embodiment has a program for performing fuel injection of a predetermined injection quantity with the injector 20 during a fuel cut period (i.e., no-injection period) of the target engine and for sensing the fuel injection characteristic of the injector and a program for performing fuel injection of a predetermined injection quantity with the injector 20 during an idling period of the engine and for sensing the fuel injection characteristic of the injector. The programs mutually compensate the faults thereof and produce a synergistic effect, enabling appropriate sensing of the fuel injection characteristic of the injector 20. Hereafter, with reference to FIGS. 4A to 11, a learning mode and a correction mode of the fuel injection characteristic by the fuel injection control device according to the present embodiment will be explained.

Figure 4A:
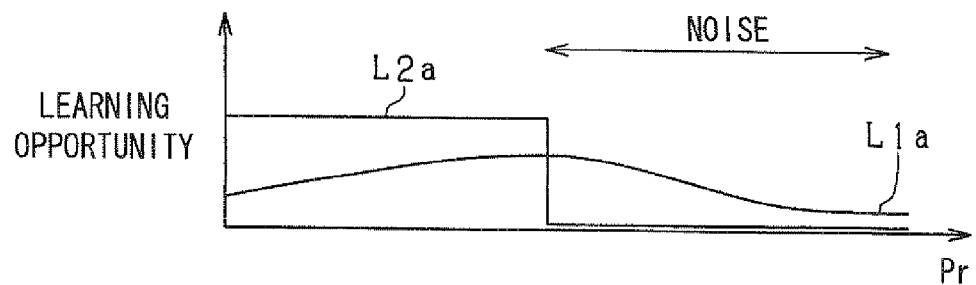
FIG. 4A is a graph showing learning processing by a fuel injection control device of a related art as a comparative example.
Figure 4B:
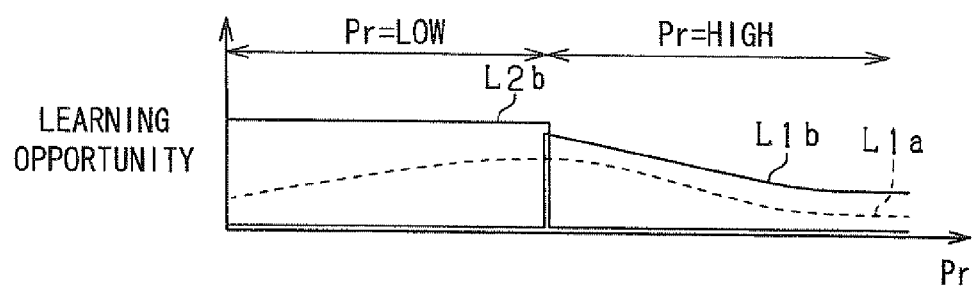
FIGS. 4B and 4C are graphs each showing learning processing by the fuel injection control device according to the embodiment.
Figure 4C:
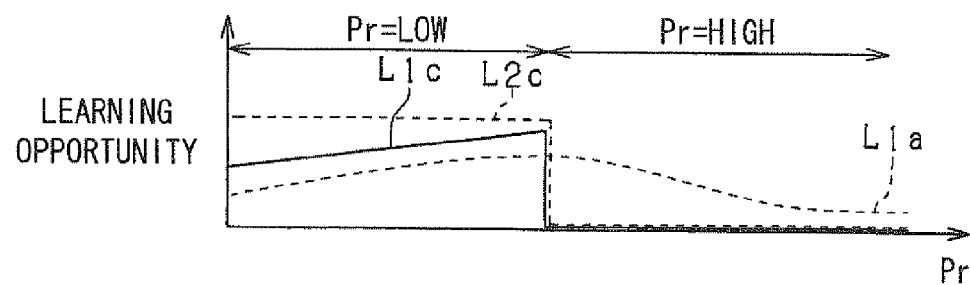

First, with reference to FIGS. 4A to 4C, an outline of the learning processing by the fuel injection control device according to the present embodiment will be explained. Here, a device (for example, the device described in Patent document 1) that performs the learning only during the fuel cut period and a device (for example, the device described in Patent document 2) that performs the learning only during the idling period are used as comparative examples. A learning mode of using only one mode of the comparative examples is shown in FIG. 4A, and a learning mode of the device according to the present embodiment (i.e., a learning mode combining the two methods) is shown in FIGS. 4B and 4C. The following explanation will be given while contrasting both.

The learning processing (sensing and storing of the fuel injection characteristic) according to the present embodiment is performed for multiple rail pressures Pr, i.e., for multiple pressure points to be learned, for each cylinder of the target engine. That is, each injection for the learning is performed after the rail pressure Pr is controlled to predetermined rail pressure, at which the learning should be performed at the time. The vertical axis of the graph shown in each of FIGS. 4A to 4C indicates a degree of opportunity (i.e., learning opportunity) to perform the learning within one learning span, which is a unit of a learning period set with travel distance or the like. The horizontal axis of the graph shown in each of FIGS. 4A to 4C indicates the magnitude of the rail pressure Pr as of the injection for the learning (i.e., the fuel pressure in the common rail 16).

As shown by a solid line L1a in FIG. 4A, with the device that performs the learning only during the fuel cut, the opportunity of the learning is maximized near the rail pressure Pr that is used most frequently during the steady operation, i.e., near the normal pressure (the rail pressure Pr in the middle of the graph). The learning opportunity reduces as the rail pressure Pr becomes higher than the pressure near the normal pressure. Since the engine output and eventually the driving force of the fuel pump 11 cannot be obtained during the fuel cut, it is difficult to control the rail pressure Pr to the higher side. Therefore, the learning at the rail pressure Pr higher than the rail pressure Pr before the execution of the fuel cut is difficult to perform. Therefore, in the high pressure range, the learning opportunity reduces as the pressure Pr increases. It is not so difficult to control the rail pressure Pr to the lower side as compared to the control to the higher side. However, even if the pressure reducing valve 18 (shown in FIG. 1) is used, the pressure reducing of the rail pressure Pr takes time. Therefore, there is a possibility that the rail pressure Pr cannot be controlled sufficiently within allowed time when the rail pressure Pr before the execution of the fuel cut is much higher than the learning pressure. Therefore, also in the low-pressure range, the learning opportunity reduces as the rail pressure Pr decreases.

As shown by a solid line L2a in FIG. 4A, the device that performs the learning only during the idling period does not perform the learning in the high-pressure range. It is because the injection for the learning performed in the silence of the idling operation causes a problem of noise if the learning is performed in the high-pressure range. However, in the low-pressure range in which the learning is performed, the learning opportunity is higher in the case of the idling than in the case of the fuel cut.

As contrasted thereto, the control device according to the present embodiment performs the learning in both of the fuel cut period and the idling period. However, the device according to the present embodiment performs the learning in the low-pressure range during the idling period as shown by a solid line L2b (with the same transition as the solid line L2a) in FIG. 4B and performs the learning in the high-pressure range during the fuel cut period as shown by a solid line L1b in FIG. 4B. Thus, many opportunities of the learning in the low-pressure range are obtained and the learning in the high-pressure range can inhibit the noise resulting from the high-pressure injection during the idling period. Moreover, in this case, the learning processing that should be performed during the fuel cut period is limited to the learning in the high-pressure range. Therefore, as compared to the case where the learning is performed in the entire pressure range from low pressure to high pressure, the learning opportunity (eventually, the learning frequency) during the fuel cut period is increased.

Thus, in the present embodiment, the learning processing in the fuel cut period is performed in the high-pressure range in priority to the low-pressure range. Then, when all of the learning that should be performed in the high-pressure range by the learning processing is completed and there is a temporal margin before the next learning span, the device performs the learning processing in the fuel cut period also in the low-pressure range as shown by a solid line L1c in FIG. 4C. In this case, two kinds of learning values of the learning value acquired by the learning processing in the idling period shown by a broken line L2c in FIG. 4C (having the same transition as the solid line L2a) and the learning value (shown by the solid line L1c) acquired by the learning processing in the fuel cut period are acquired for the low-pressure range. The control device according to the present embodiment calculates an average of the two kinds of the sensing values to improve the learning accuracy.

Next, a concrete procedure and processing contents of the learning processing performed by the fuel injection control device according to the present embodiment will be explained.

Figures 5, 6, 7:
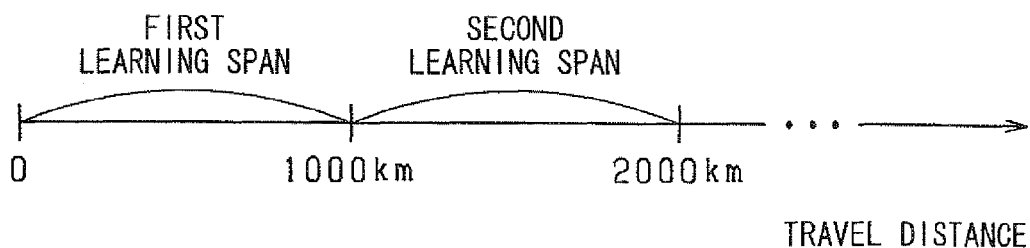
FIG. 5 is a map showing a storing mode of a learning value by learning processing according to the embodiment.
FIG. 6 is a map showing a progress of the learning according to the embodiment.
FIG. 7 is a schematic diagram showing a transition of a learning span according to the embodiment.

As described above, the learning processing according to the present embodiment is performed respectively for the multiple rail pressures (equivalent to fuel injection pressure levels) for each cylinder of the target engine. Here, for the sake of convenience of the explanation, in an example, five ranges A to E (in which the rail pressure Pr increases in the order of the ranges A, B, C, D, and E) are assumed as the entire ranges (for example, a range from 32 to 140 MPa) where the learning should be performed as shown in FIG. 5. In the example, the learning in the range A or B (referred to also as a second situation) of the low rail pressure Pr is performed in the idling period. In the example, the learning in the range C, D or E (referred to also as a first situation) of the high rail pressure Pr is performed during the fuel cut. The control device has a map shown in FIG. 6 (stored in the EEPROM in the ECU 30, for example), Therefore, the device can grasp progress of the learning, i.e., which mode (the fuel cut mode or the idling mode) of the learning is completed in which range (one of the ranges A to E) for which cylinder (one of the cylinders #1 to #4). Each of circle marks in FIG. 6 indicates the completion of the learning. The map shown in FIG. 6 is reset every time the learning span ends. That is, one time of the learning (data updating) in each range is made per the learning span. In the present embodiment, as shown in FIG. 7, the processing proceeds to the next learning span (that is, the current learning span ends) every time a travel distance of 1000 km is accumulated after the last learning span.

Figure 8:
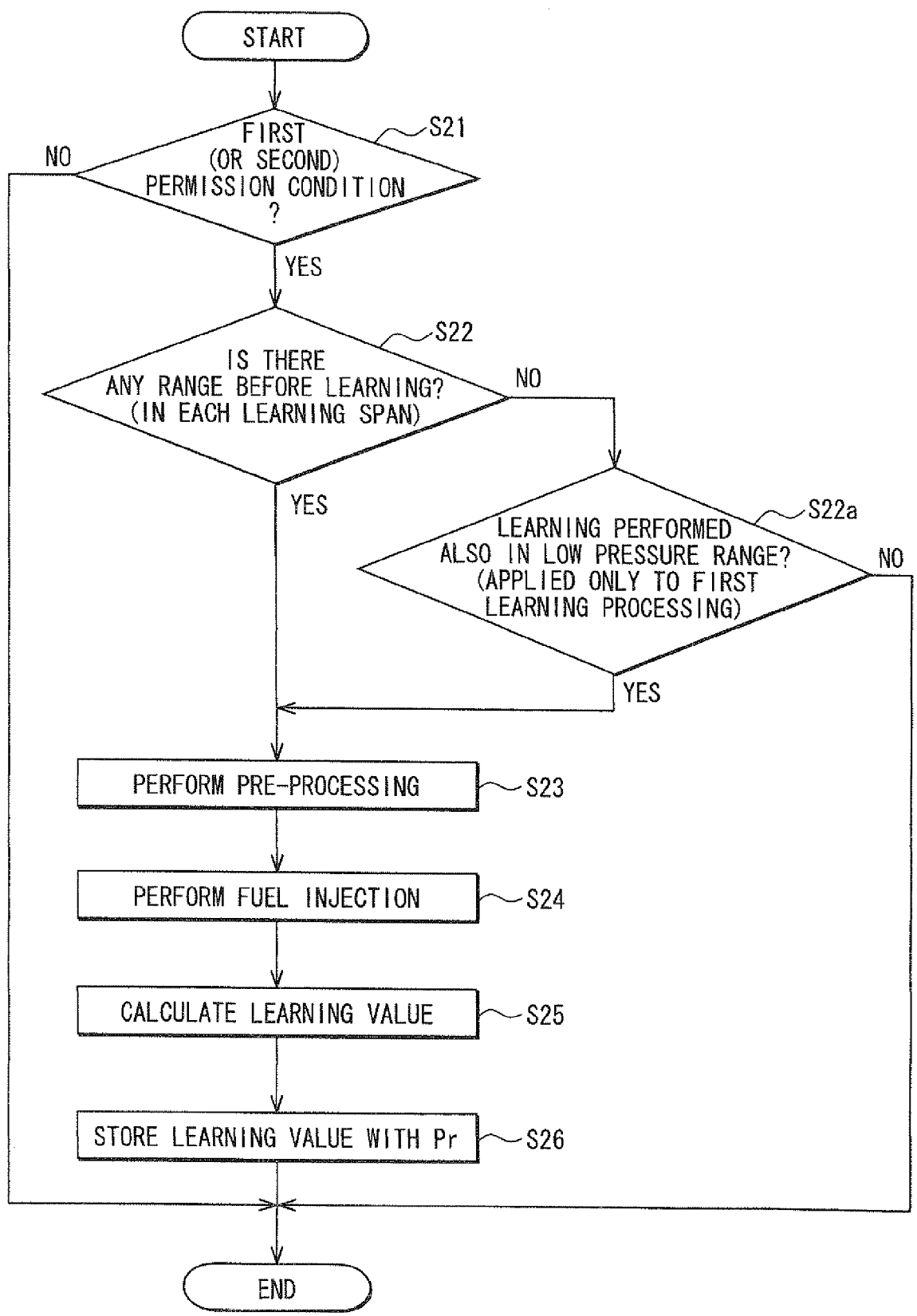
FIG. 8 is a flowchart showing a procedure of the learning processing by the fuel injection control device according to the embodiment.
Figure 9:
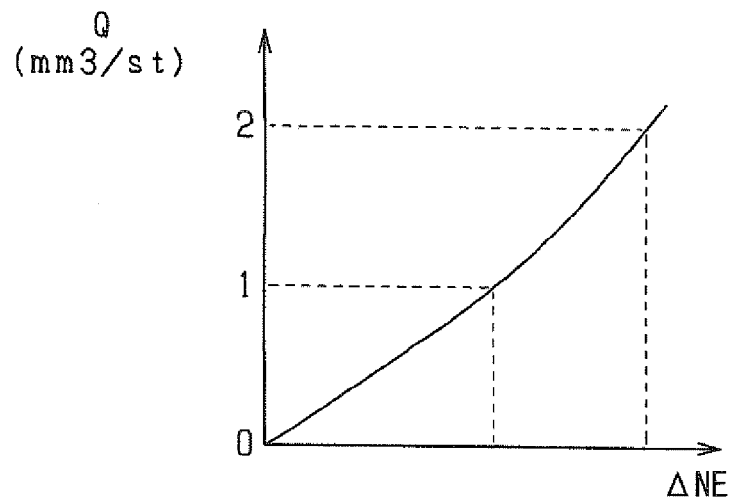
FIG. 9 is a graph showing a calculation mode of a fuel injection quantity in the learning processing according to the embodiment.

FIG. 8 is a flowchart showing a procedure of the learning processing by the fuel injection control device according to the present embodiment. Hereafter, a procedure and processing contents of two types of the learning processing (first learning processing) performed during the fuel cut period and the learning processing (second learning processing) performed during the idling period will be explained in the order of the first learning processing and the second learning processing with reference to FIG. 8. Fundamentally, a series of the processing shown in FIG. 8 is sequentially performed at a predetermined processing interval (for example, at a predetermined crank angle or in a predetermined cycle) while a predetermined condition is satisfied (for example, the condition is invariably satisfied while the engine is operating) through execution of the program stored in the ROM by the ECU 30. The values of the various parameters used in the processing are sequentially stored in the storage devices mounted in the ECU 30 such as the RAM, the EEPROM and the backup RAM and are updated at any time when necessary.

As shown in FIG. 8, it is determined whether a predetermined condition (a first permission condition) is satisfied, or more specifically, whether the target engine is performing the fuel cut, in S21 before execution of first learning processing. In the present embodiment, the fuel cut is performed in all the cylinders in a deceleration period (i.e., no-injection deceleration operation) after the operation amount ACCP of the accelerator is brought to 0 (i.e., after the driver releases the accelerator).

In following S22, the cylinder having the range, in which the learning has not been performed yet, among the learning ranges C to E shown in FIG. 5 assigned to the first learning processing (except for the range, in which the learning is impossible because of the current rail pressure and the like) is searched. If it is determined that there is an applicable cylinder in S22, the processing proceeds to S23 to perform the learning for the cylinder (referred to as a target cylinder, hereinafter). When there are multiple applicable cylinders, a cylinder having the smallest cylinder number is selected as the target cylinder.

In S23, learning pre-processing is performed for the target cylinder. For example, in the pre-processing, various learning environments such as the rail pressure Pr, an EGR quantity (i.e., an EGR valve opening degree) of the target engine, a supercharging quantity (for example, a throttle opening degree of a variable nozzle turbo), and a throttle valve opening degree of the intake passage are adjusted into predetermined ranges. If the learning pre-processing is completed, in following S24, the fuel injection is performed with the injector 20 in accordance with a predetermined command value (for example, pulse width corresponding to the pilot injection). The processing can be performed through a series of the processing shown in FIG. 3. The fuel injection is performed as a single-shot injection in the first learning processing.

In following S25, the fuel injection characteristic is sensed and the learning value is stored. That is, after the execution of the fuel injection in S24, a change in the behavior of the engine output shaft (the crankshaft 41) caused by the fuel injection, or in more detail, an increase $\Delta NE$ in the engine rotation speed NE (i.e., the rotation speed of the crankshaft 41) due to the fuel injection, is calculated. The $\Delta NE$ increase in the engine rotation speed NE is actually measured with the crank angle sensor 41a. Then, the injection quantity Q is calculated from the increase ΔNE in the engine rotation speed NE based on a map (or a mathematical expression) shown in FIG. 9. Thus, a relationship between the injection command (the command value of S24) and the actually injected fuel quantity (the value Q calculated based on map of FIG. 9) is measured as an injection characteristic of the injector 20. For example, the map can be created by using a correlation between the increase ΔNE in the engine rotation speed NE due to the fuel injection and generated torque and a correlation between the generated torque and the fuel injection quantity Q.

The actually injected fuel quantity (the calculated value) is divided by the fuel quantity (a reference value) that has been supposed to be injected according to the injection command, thereby obtaining a deviation between the calculated value and the reference value as a learning value (learning value=calculated value/reference value). The magnitude of the learning value is equivalent to an characteristic error of the injector.

In following S26, the learning value calculated in S25 is associated with the rail pressure Pr at that time and is stored in the predetermined storage device (for example, the EEPROM in the ECU 30). In more detail, five storage areas corresponding to the ranges A to E shown in FIG. 5 are provided in the storage device, and the learning value is stored in one of the storage areas (i.e., either one of the ranges C to E) corresponding to the rail pressure Pr at the time. When data of the preceding learning span remains in the target storage area, the old data is updated with newest data (i.e., data acquired this time).

A series of the processing shown in FIG. 8 is ended with the processing in S26. In the present embodiment, the injection is performed multiple times (for example, ten times) under the same condition and the rotation speed increase amounts ΔNE due to the multiple times of the injection are calculated by repeating the processing from S21 to S26. Then, the final fuel injection characteristic and the final learning value are acquired using an average value of the increase amounts ΔNE. When the learning in the ranges C to E shown in FIG. 5 for all the cylinders of the target engine is completed, it is determined in S22 that there is no applicable cylinder.

In this case, it is determined whether to perform the first learning processing (i.e., processing from S23 to S26) for the lower pressure ranges A and B in following S22a. In more detail, it is determined whether there is a temporal margin before the next learning span, for example. In this case, it is also determined whether there is any cylinder that has not undergone the learning for the range A or B (as processing similar to that of S22). Only when there is an applicable cylinder, it is determined that the first learning processing should be performed in the range A or B for the applicable cylinder (or one of the cylinders when there are multiple applicable cylinders). When it is determined in S22a that the first learning processing should be performed also in the ranges A and B on the low-pressure side, the learning values for the ranges A and B are acquired and stored through the processing of S23 to S26. When it is determined that the first learning processing may not be performed in the ranges A and B in S22a, a series of the processing shown in FIG. 8 is ended.

Next, the second learning processing will be explained. The fundamental procedure of the second learning processing is similar to that of the first learning processing. Therefore, an explanation will be given centering on differences from the first learning processing here.

As shown in FIG. 8, also in the case of the second learning processing, it is determined whether a predetermined condition (a second permission condition) is satisfied in S21 before execution of the second learning processing. However, it is determined here whether the target engine is performing the idling. In the present embodiment, it is determined that the target engine is performing the idling operation when predetermined conditions are satisfied. For example, the predetermined conditions include a condition that the operation amount ACCP of the accelerator (sensed with the accelerator sensor 30a) is substantially 0, a condition that that a shift lever is positioned at a neutral (N) position, and a condition that the engine rotation speed NE (sensed with the crank angle sensor 41a) is within a predetermined range.

In following S22, the cylinder having the range, in which the learning has not been performed, among the learning ranges (i.e., the ranges A and B shown in FIG. 5) assigned to the second learning processing is searched. If it is determined in S22 that there is an applicable cylinder, the processing proceeds to S23 to perform the learning for the cylinder as a target. After the processing similar to that of the first learning processing is performed in S23, the fuel injection is performed with the injector 20 in following S24. However, the fuel injection is performed as a multiple injection in the second learning processing.

That is, as the fuel injection in the second learning processing, predetermined times (for example, five times) of the fuel injections are performed during one combustion cycle. In this case, the command value of each injection (for example, pulse width corresponding to the pilot injection) is set at a value calculated by equally dividing a basic idling injection quantity for maintaining the idling state by a predetermined time number of the injections. For example, the basic idling injection quantity is an adaptation value acquired in accordance with the engine operation state and the like based on a predetermined map. For example, when the basic idling injection quantity is 5 mm3/st and five times of the injections are performed, the injection quantity (a basic pilot injection quantity) of each injection is set at 1 mm3/st. In following S25, the fuel injection characteristic is sensed and the learning value is stored based on the change in the behavior of the engine output shaft (the crankshaft 41) due to the above multiple injection.

In more detail, in the present embodiment, an average value of the engine rotation speed NE (average engine rotation speed) is calculated for every combustion cycle by a routine separate from the processing shown in FIG. 8. The fuel injection quantities of all the cylinders are uniformly corrected to conform the average engine rotation speed to target rotation speed. This processing is called as ISC correction (idle engine rotation speed correction), and a correction value that is uniform among all the cylinders for performing the ISC correction is called as an ISC correction value. The ISC correction value is calculated as a value for compensating a deviation between the average engine rotation speed and the target rotation speed.

Furthermore, a fluctuation amount of the engine rotation speed NE is sensed for every cylinder and for every combustion cycle and is compared with an average value of the fluctuation amounts of all the cylinders. Then, the fuel injection quantities of the respective cylinders are individually corrected to smooth the fluctuation amounts among the cylinders. This processing is called as FCCB correction (rotation speed fluctuation inter-cylinder correction). Correction values for the respective cylinders for performing the FCCB correction are called as FCCB correction values. Each FCCB correction value is calculated as a value for compensating a deviation of the engine rotation speed fluctuation amount between the sensing value of each cylinder and the average value of all the cylinders.

The ISC correction and the FCCB correction are performed for all the cylinders for every combustion cycle. In this case, the pilot injection quantity can be expressed with a following relational expression.

$$Qp=(Qb+ISC+FCCB)/n+LVpre \times K$$

In the expression, Qp represents the pilot injection quantity, Qb is the basic idling injection quantity, ISC is the ISC correction value, FCCB is the FCCB correction value, n is the number of the injections, LVpre is the previous learning value, and K is a correction coefficient.

In S25, the sensing value of the fuel injection characteristic and the learning value are acquired using the correction values ISC, FCCB. That is, a value calculated by dividing the ISC correction value by n (for example, five) is added to a value calculated by dividing the FCCB correction value by n (for example, 5) to calculate a value, which is sensed as the fuel injection characteristic. Furthermore, the previous learning value is added to the above additional value to obtain a present learning value. An initial value of the learning value is zero. In following S26, the learning value calculated in S25 is associated with the rail pressure Pr at the time and is stored in the predetermined storage device (for example, the EEPROM in the ECU 30). In the second learning processing, when it is determined that there is no applicable cylinder in S22, the series of the processing shown in FIG. 8 is ended without passing through S22a.

Figure 10:
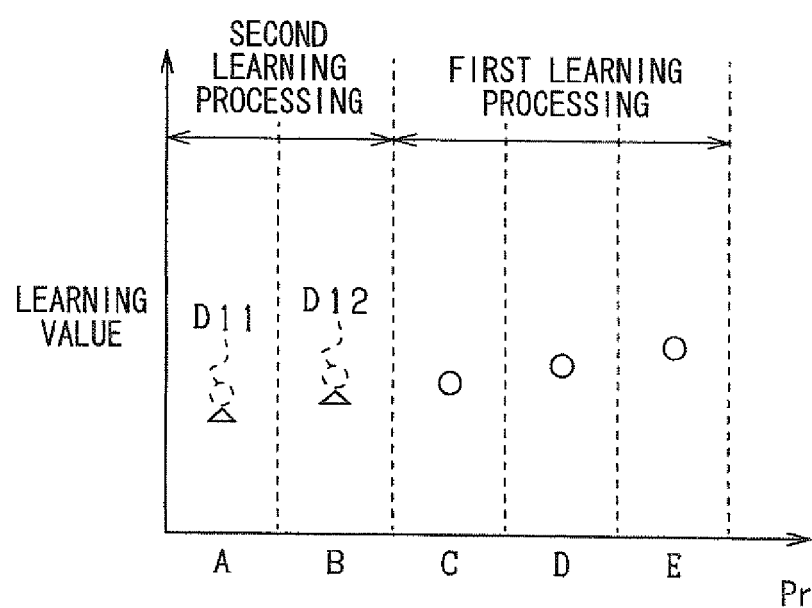
FIG. 10 is a graph showing an example of the learning value acquired by the learning processing according to the embodiment.

An example of the learning value acquired by the processing shown in FIG. 8 is shown in FIG. 10 as a graph. Data D11 and D12 in FIG. 10 are the learning values acquired through S22a in the first learning processing.

Figure 11:
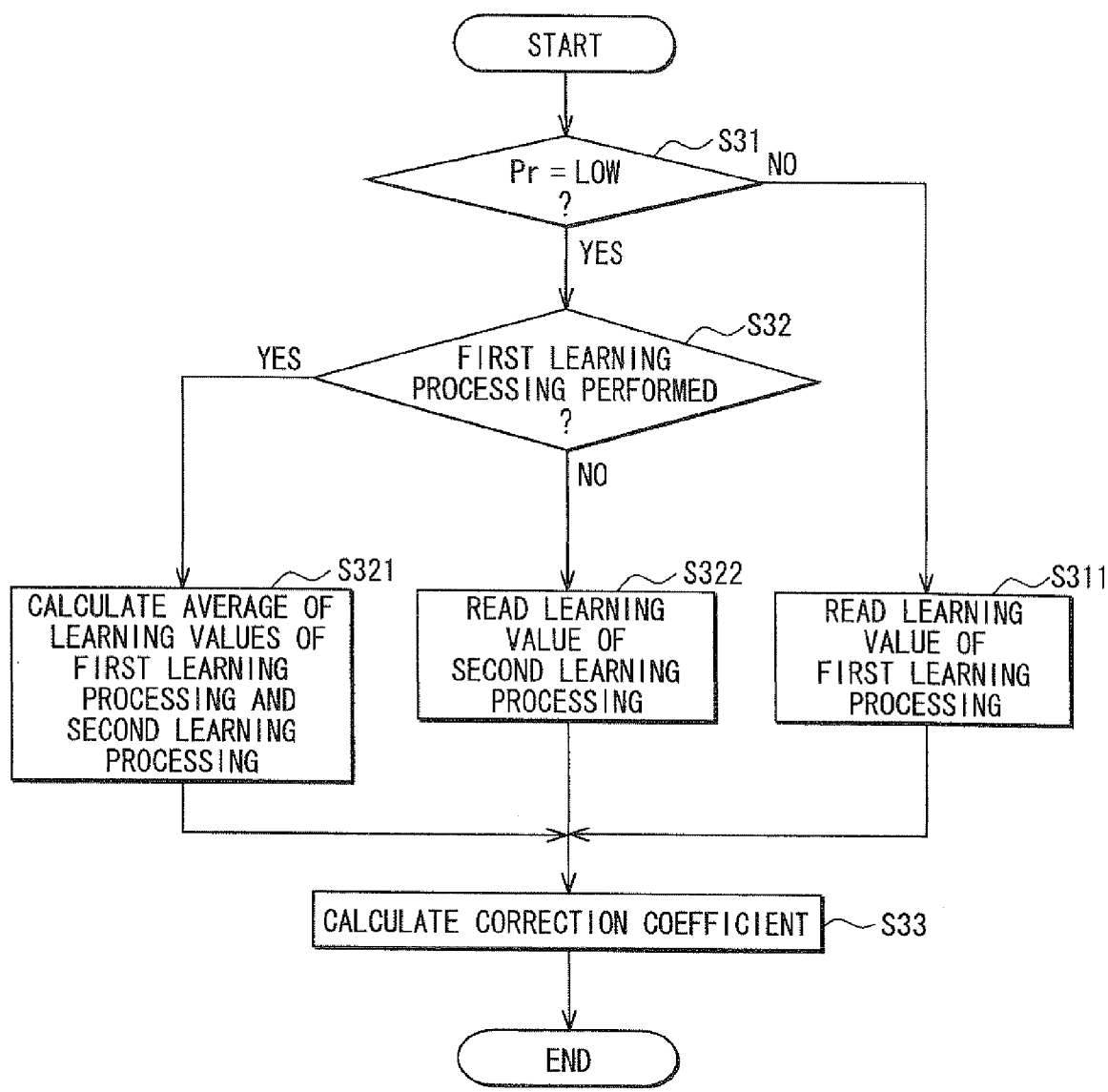
FIG. 11 is a flowchart showing a procedure for correcting a command value of the injector based on the learning value according to the embodiment.

FIG. 11 is a flowchart showing a procedure of correcting the command value of the injector 20 using the learning value acquired and stored through the processing shown in FIG. 8. A series of the processing shown in FIG. 11 is also executed sequentially through execution of the program stored in the ROM by the ECU 30. Fundamentally, the series of the processing shown in FIG. 11 is performed for each cylinder of the target engine in synchronization with the processing shown in FIG. 3 (for example, as a part of the processing of S12). Values of various parameters used in the processing are sequentially stored in the storage devices mounted in the ECU 30 such as the RAM, the EEPROM and the backup RAM and are updated at any time when necessary.

As shown in FIG. 11, on the occasion of the correction, first in S31, the rail pressure Pr at that time (i.e., the value actually measured by the fuel pressure sensor 16a) is compared with a predetermined threshold value (set between the ranges B and C shown in FIG. 5) to determine whether the rail pressure Pr is low (i.e., rail pressure Pr<threshold value).

When it is determined that the pressure Pr is not low in S31, the learning value acquired by the first learning processing (i.e., one of the learning values of the ranges C to E) is read in S311. At further following S33, a correction coefficient of the command value of the injector 20 is calculated based on the read learning value. For example, if the rail pressure Pr at the time coincides with the learning point (the range C, D or E), the corresponding learning value is used as the correction coefficient as it is. If the rail pressure Pr at the time does not coincide with the learning point, the correction coefficient for the rail pressure at the time is calculated by performing extrapolation or interpolation (such as arithmetical average or weighted average) with nearby learning values or by using the nearest learning value. A series of the processing shown in FIG. 11 is ended with the processing in S33.

When it is determined in S31 that the rail pressure Pr is low, it is determined in S32 whether the learning values of the ranges A and B are obtained by the first learning processing (for example, whether the data D11 and D12 of FIG. 10 exist). When it is determined in S32 that there is no data (the learning value) obtained by the first learning processing, the learning value (one of the learning values of the ranges A and B) obtained by the second learning processing is read at following S322. In further following S33, the correction coefficient of the command value of the injector 20 is calculated based on the read learning value by the same processing as the case of the first learning processing.

When it is determined that there is the data (the learning value) obtained by the first learning processing in S32, an average value (an arithmetical average or a weighted average) of the learning value obtained by the first learning processing and the learning value obtained by the second learning processing is calculated and is used for calculation of the correction coefficient in following S33. When only part of the data (for example, the data only in the range B) by the first learning processing is obtained, the average value is used for the obtained part (for example, the range B), and the data by the second learning processing is used for the other part (for example, the range A).

In the present embodiment, the correction coefficient of the command value of the injector 20 obtained in this way is used in S12 of FIG. 3. Thus, the characteristic error of the injector 20 is corrected and appropriate fuel injection control can be performed.

As explained above, the fuel injection control device and the engine control system according to the present embodiment exert following outstanding effects.

(1) The fuel injection control device according to the present embodiment is applied to the engine that rotates the output shaft with the torque generated by combusting the fuel injected and supplied by the injector 20 in the predetermined cylinder during the operation and controls the injection operation of the injector 20. The fuel injection control device has the program (a first parameter acquisition device: S23 to S25 of FIG. 8) that performs the fuel injection of the predetermined injection quantity (the small quantity) with the injector 20 based on the establishment of the predetermined first permission condition (which is determined in S21 of FIG. 8) during the predetermined fuel cut of the engine (i.e., the fuel cut performed with the deceleration from the high-speed state) and that acquires the fuel injection quantity (the first injection parameter) indicating the fuel injection characteristic of the injector. The fuel injection control device has the program (a second parameter acquisition device: S23 to S25 of FIG. 8) that performs the fuel injection of the predetermined injection quantity (the small quantity) with the injector 20 based on the establishment of the predetermined second permission condition (which is determined in S21 of FIG. 8) during the predetermined idling of the engine and that acquires the fuel injection quantity (the second injection parameter) indicating the fuel injection characteristic of the injector. Thus, the two kinds of the programs performing the first learning processing and the second learning processing compensate the faults thereof mutually and produce a synergistic effect, enabling appropriate measurement of the fuel injection characteristic of the injector 20.

(2) In S25 of FIG. 8 (the first learning processing and the second learning processing), the fuel injection is performed and the fuel injection quantity is calculated based on the change in the behavior of the engine output shaft (the increase amount in the rotation speed) caused by the fuel injection. With such the construction, based on the change in the behavior of the engine output shaft caused by the execution of the injection as the target of the sensing, the fuel injection quantity of the injection (equivalent to the fuel injection characteristic) can be sensed easily and appropriately in a manner similar to the manner used by the device described in Patent document 1 or 2.

(3) In S24 of FIG. 8 (the second learning processing), the multiple times of (i.e., the multiple steps of) injections (i.e., the multiple injections of the same injection quantity) are performed in one combustion cycle. The fuel injection quantity is calculated based on the change in the behavior of the engine output shaft caused by the entire fuel injections. Thus, the injection characteristic concerning the small quantity injection (including the subsidiary injection) can be suitably sensed, while securing the torque necessary for the idling.

(4) The fuel injection control device has the program (a first parameter storing device: S26 of FIG. 8) that stores the learning value acquired by the first learning processing in the predetermined storage device while relating the learning value to each situation defined by a content of a specific parameter indicating the current situation (for example, the state of the engine or the vehicle), or in more detail, to the magnitude of the rail pressure equivalent to the injection pressure level of the injector 20. The fuel injection control device has the program (a second parameter storing device: S26 of FIG. 8) that stores the learning value acquired by the second learning processing in the predetermined storage device while relating the learning value to each situation defined by the magnitude of the rail pressure. With such the construction, by storing the learning value related to each situation (the rail pressure), each parameter value corresponding to (suitable to) each situation can be read when the parameter is used.

(5) The pressure in the common rail 16 (i.e., the rail pressure) is employed as the fuel injection pressure level. Accordingly, the fuel injection pressure level can be sensed easily.

(6) Two situations are defined in accordance with the magnitude of the injection pressure level of the injector 20. That is, the situation of the ranges C to E (the first situation) and the situation of the ranges A and B (the second situation) are defined. In the first learning processing (S23 to S26 of FIG. 8), the learning values for the ranges C to E, where the injection pressure level is relatively high, are stored preferentially. In the second learning processing (S23 to S26 of FIG. 8), the learning values for the ranges A and B are stored preferentially. With such the device, the possibility of generation of the noise resulting from the high-pressure injection during the idling period can be restricted to be low, while securing sufficient learning opportunity (eventually, learning frequency).

(7) In the second learning processing (S23 to S26 of FIG. 8), the learning values for the ranges C to E are not stored. Thus, the noise can be prevented certainly.

(8) In the first learning processing (S23 to S26 of FIG. 8), when the storage of the learning values for the ranges C to E is completed, the storage of the learning values for the ranges A and B is started based on establishment of the predetermined condition (which is determined in S22a). With such the device, both of the fuel injection characteristics sensed during the fuel cut period and the idling period can be acquired and stored as the fuel injection characteristic for the ranges A and B.

(9) When the learning values for the ranges A and B are stored in both of the fuel cut period and the idling period (which is determined in S32 of FIG. 11), the average value of the sensing values is used (in S321 of FIG. 11). Thus, the learning accuracy of the fuel injection characteristic can be raised.

(10) The fuel injection control device has the program (an injection characteristic error derivation device: S25 of FIG. 8) that compares the fuel injection characteristic (the fuel injection quantity) acquired by the first learning processing or the second learning processing with the corresponding reference value (for example, the initial value) to obtain the error of the fuel injection characteristic of the injector 20 (equivalent to the learning value). Thus, the injection characteristic error can be sensed easily and appropriately.

(11) The fuel injection control device has the program (S12 of FIG. 3 and FIG. 11) that corrects the fuel injection characteristic of the injector 20 based on the error of the fuel injection characteristic obtained by the processing in S25 of FIG. 8. Thus, the injection characteristic can be corrected easily and appropriately.

(12) The program (an engine control device) that performs predetermined control related to the target engine based on the operation of the injector 20 is mounted in the ECU 30 in addition to the above-described programs. The engine control system has the various sensors and actuators (refer to FIG. 1) including the injector 20 in addition to the ECU 30. With such the construction, appropriate fuel injection control and eventually reliable engine control can be performed.

The above described embodiment may be modified and implemented as follows, for example.

In the above-described embodiment, it is determined whether there is a time margin before the next learning span in S22a of FIG. 8. When there is no or little time margin, the first learning processing is not performed for the ranges A and B on the low-pressure side. However, the present invention is not limited thereto, but the determination criterion in S22a may be set arbitrarily, For example, a predetermined switch (a switch whose state is switched by an operation of the user) or the like for reflecting the intention of the user may be provided, and the determination of YES/NO in S22a may be performed based on the state (ON/OFF) of the switch. The determination processing in S22a is not an indispensable composition but may be omitted if unnecessary according to the use or the like. In this case, the processing may proceed to the next learning span at the same time when it is determined that the entire learning is completed in S22 of FIG. 8, i.e., irrespective of the remaining time to the next learning span.

In the above-described embodiment, when the learning values for the ranges A and B are stored in both of the fuel cut period and the idling period, the average value of the sensing values is used. Alternatively, instead of using the average value, the more reliable sensing value out of the two kinds of the learning values acquired by the first learning processing and the second learning processing may be used. For example, the processing of FIG. 12 may be performed in place of the processing of FIG. 11. S41, S42, S431, S432 and S44 of FIG. 12 are similar to S31, S32, S322, S311, and S33 of FIG. 11.

Figure 12:
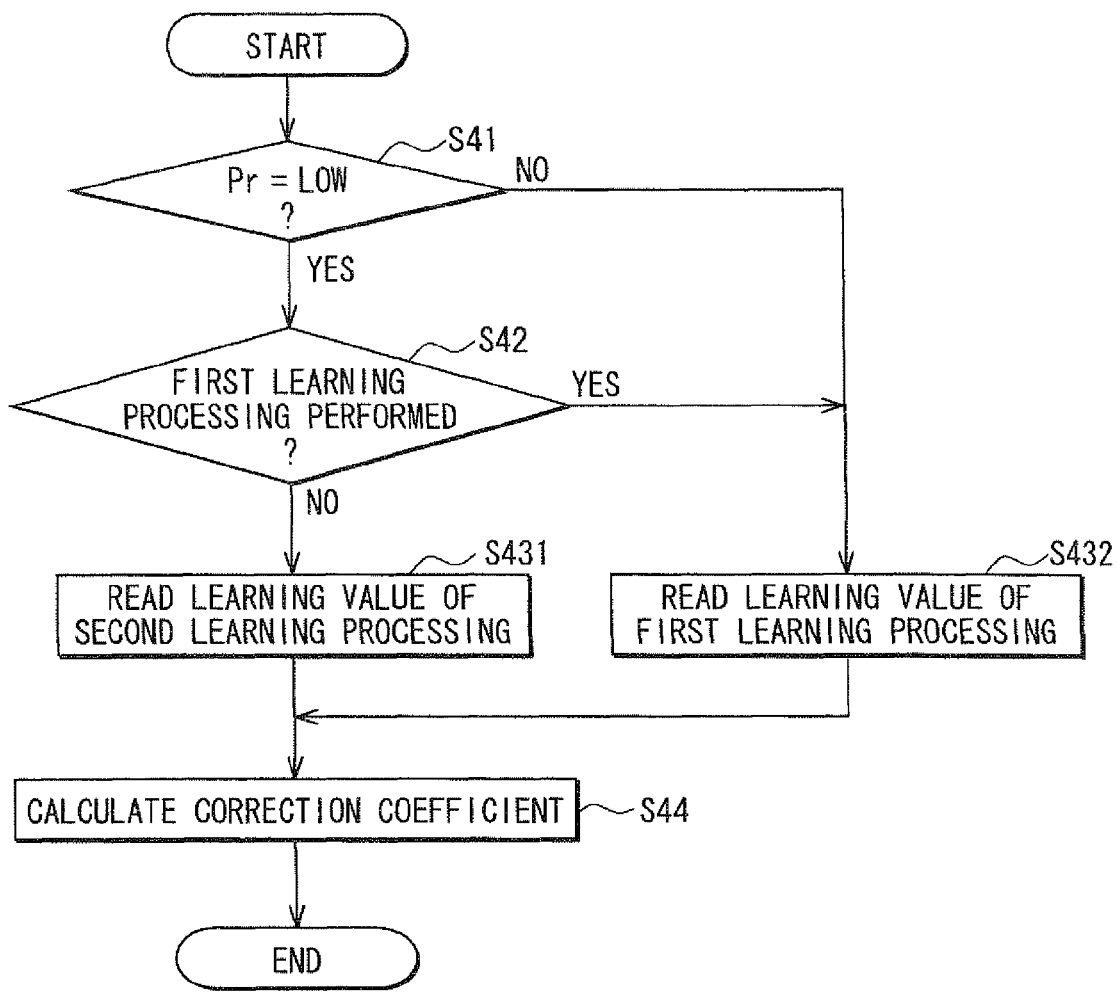
FIG. 12 is a flowchart showing a modified example of the correction processing according to the embodiment.

As shown in the FIG. 12, in the processing, the learning value acquired by the first learning processing is used when the learning values for the ranges A and B are stored in both of the fuel cut period and the idling period (which is determined in S42 of FIG. 12). Normally, the learning value acquired by the first learning processing is more reliable than the learning value acquired by the second learning processing. Therefore, with such the construction, the existence/nonexistence of the abnormality in the injector 20 can be diagnosed easily and appropriately.

Figure 13:
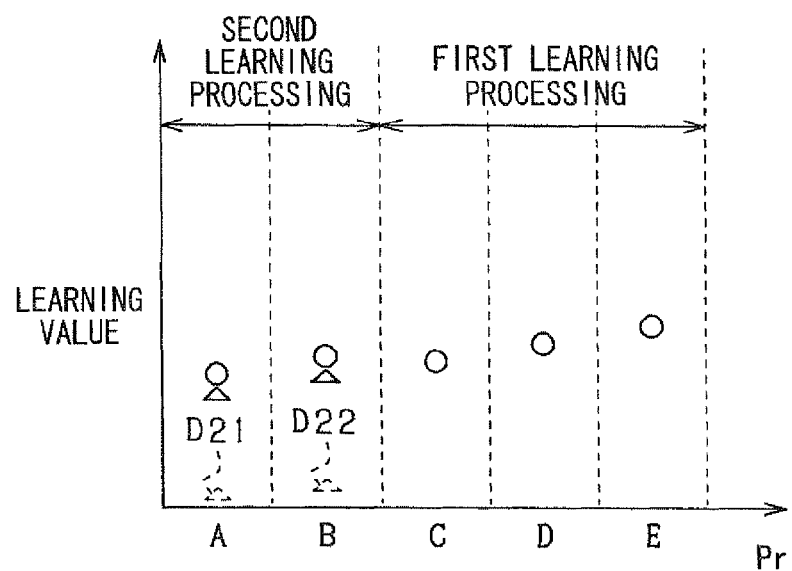
FIG. 13 is a graph showing a modified example of the correction processing according to the embodiment.

A construction of determining the learning value acquired by the second learning processing in S42 of FIG. 12 and of using the learning values acquired by the first learning processing also for the ranges A and B when the learning values acquired by the second learning processing indicate abnormal values (for example, as data D21 and D22 shown by broken lines in FIG. 13) as compared to the other learning values (the learning values for the ranges C to E) acquired by the first learning processing is also effective.

Figure 14:
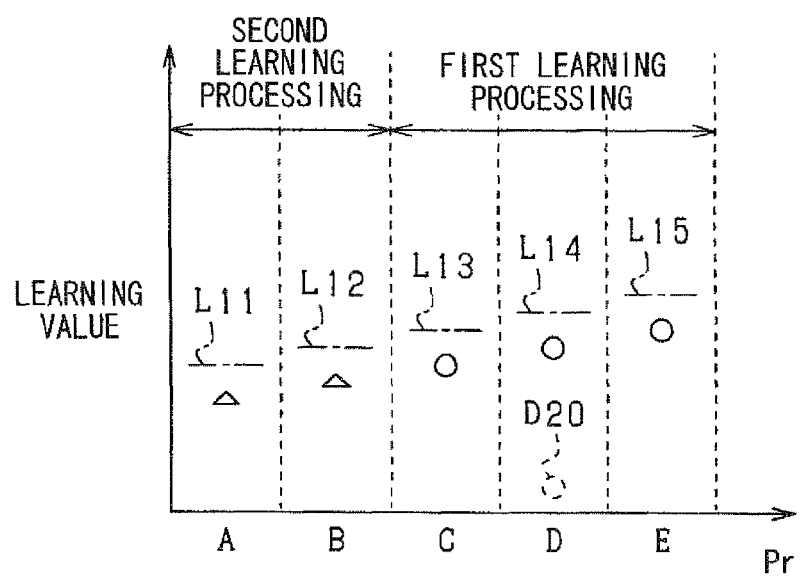
FIG. 14 is a graph showing a diagnosing mode of an injector based on a learning value according to another embodiment of the present invention.

The fuel injection control device may have a program for diagnosing existence/nonexistence of the abnormality in the injector 20 based on the learning values (for example, shown in FIG. 10) stored in predetermined storage device by the first learning processing and the second learning processing respectively. For example, a construction of setting permissible limits (permissible upper limits for errors) individually for the respective learning values (learning values for the ranges A to E) as shown by chained lines L11 to L15 in FIG. 14 and of determining that the injector 20 is abnormal when the current learning value exceeds the permissible limit is also effective. Alternatively, the injector 20 may be determined to be abnormal when only a single data (or similar small number of data) indicates a value greatly different from the other data as in the case of data D20 shown by a broken line in FIG. 14. Alternatively, a data history may be kept, and the abnormality diagnosis may be performed by comparing the current data with the past data. For example, it is effective to determine that the injector 20 is abnormal when the change from the previous value is large. It is effective to perform predetermined failsafe processing such as informing processing to the driver (for example, lighting of a warning light) when one of the above-described devices determines that the injector 20 is abnormal.

The learning spans (shown in FIG. 7) may be set arbitrarily. For example, boundary values among the learning spans may be fixed or may be variable. Instead of setting the boundary value with the travel distance, for example, the boundary value may be set with the time number of operation (ON/OFF operation) of an ignition switch, time or the like. Furthermore, the transition of the learning span may be made based on a request from the user.

The kind and the system configuration of the engine as the control target may also be arbitrarily modified in accordance with the use and the like. For example, the present invention can be applied not only to the compression ignition type diesel engine but also to a gasoline engine of a spark ignition type or the like. The present invention can be applied not only to the reciprocating engine but also to a rotary engine or the like. When such the alteration of the construction of the above-described embodiment is performed, it is desirable to alter the details of the various types of processing (programs) described above into optimum configurations in accordance with actual construction (as design change).

In the above embodiment and modifications, it is assumed that various kinds of software (programs) are used. Alternatively, the same functions may be realized by hardware such as dedicated circuits.

While the invention has been described in connection with what is presently considered to be the most practical and preferred embodiments, it is to be understood that the invention is not to be limited to the disclosed embodiments, but on the contrary, is intended to cover various modifications and equivalent arrangements included within the spirit and scope of the appended claims.

What is claimed is:

1. A fuel injection control device for an engine that combusts fuel, which is supplied by a predetermined injector through an injection, in a predetermined cylinder to generate torque and that rotates an output shaft with the generated torque, the fuel injection control device controlling an injection operation of the injector and comprising:
    a first parameter acquisition means for performing fuel injection of a predetermined injection quantity with the injector based on establishment of a predetermined first permission condition during fuel cut of the engine and for acquiring a first injection parameter indicating a fuel injection characteristic of the injector; and
    a second parameter acquisition means for performing fuel injection of a predetermined injection quantity with the injector based on establishment of a predetermined second permission condition during idling of the engine and for acquiring a second injection parameter indicating the fuel injection characteristic of the injector.

2. The fuel injection control device as in claim 1, wherein the first parameter acquisition means performs the fuel injection and calculates a fuel injection quantity as the first injection parameter based on a change in a behavior of the engine output shaft caused by the fuel injection, and
    the second parameter acquisition means performs the fuel injection and calculates a fuel injection quantity as the second injection parameter based on a change in a behavior of the engine output shaft caused by the fuel injection.

3. The fuel injection control device as in claim 2, wherein the second parameter acquisition means performs multiple times of the fuel injections during one combustion cycle based on the establishment of the predetermined second permission condition during the idling of the engine and calculates the fuel injection quantity as the second injection parameter based on a change in the behavior of the engine output shaft caused by the entire fuel injections.

4. The fuel injection control device as in claim 1, further comprising:
    a first parameter storing means for storing a value of the first injection parameter acquired by the first parameter acquisition means in a predetermined storage device while relating the value to each situation defined by one or more contents of one or more specific parameters consisting of one or more predetermined parameters indicating each situation; and
    a second parameter storing means for storing a value of the second parameter acquired by the second parameter acquisition means in a predetermined storage device while relating the value to each situation defined by the one or more contents of the one or more specific parameters.

5. The fuel injection control device as in claim 4, wherein the one or more specific parameters include an injection pressure level of the injector.

6. The fuel injection control device as in claim 4, wherein the first parameter acquisition means and the first parameter storing means preferentially store the first injection parameter for a first situation, in which an injection pressure level is higher than in a second situation, the first situation and the second situation being defined in accordance with a magnitude of the injection pressure level of the injector, and
    the second parameter acquisition means and the second parameter storing means preferentially store the second injection parameter for the second situation.

7. The fuel injection control device as in claim 6, wherein the second parameter acquisition means and the second parameter storing means do not store the first injection parameter for the first situation.

8. The fuel injection control device as in claim 6, wherein the first parameter acquisition means and the first parameter storing means start storing the first injection parameter for the second situation based on establishment of a predetermined condition when the storage of the first injection parameter for the first situation is completed.

9. The fuel injection control device as in claim 4, further comprising;
a diagnosing means for diagnosing existence/nonexistence of an abnormality in the injector based on the first injection parameter and the second injection parameter stored in the predetermined storage devices respectively by the first parameter storing means and the second parameter storing means.

10. The fuel injection control device as in claim 1, further comprising:
an injection characteristic error derivation means for calculating an error of the fuel injection characteristic of the injector by comparing the first injection parameter acquired by the first parameter acquisition means or the second injection parameter acquired by the second parameter acquisition means with a corresponding reference value.

11. The fuel injection control device as in claim 10, further comprising:
a correction means for correcting the fuel injection characteristic of the injector based on the error of the fuel injection characteristic calculated by the injection characteristic error derivation means.

12. An engine control system for an engine, the engine control system comprising:
an injector for performing injection supply of fuel into a predetermined cylinder of the engine, the fuel being combusted in the cylinder to generate torque and to rotate an output shaft of the engine with the generated torque;
a fuel injection control device for controlling an injection operation of the injector; and
an engine control means for performing predetermined control related to the engine based on the operation of the injector, wherein
the fuel injection control device includes:
a first parameter acquisition means for performing fuel injection of a predetermined injection quantity with the injector based on establishment of a predetermined first permission condition during fuel cut of the engine and for acquiring a first injection parameter indicating a fuel injection characteristic of the injector; and
a second parameter acquisition means for performing fuel injection of a predetermined injection quantity with the injector based on establishment of a predetermined second permission condition during idling of the engine and for acquiring a second injection parameter indicating the fuel injection characteristic of the injector.

13. The engine control system as in claim 12, wherein
the first parameter acquisition means performs the fuel injection and calculates a fuel injection quantity as the first injection parameter based on a change in a behavior of the engine output shaft caused by the fuel injection, and
the second parameter acquisition means performs the fuel injection and calculates a fuel injection quantity as the second injection parameter based on a change in a behavior of the engine output shaft caused by the fuel injection.

14. The engine control system as in claim 13, wherein
the second parameter acquisition means performs multiple times of the fuel injections during one combustion cycle based on the establishment of the predetermined second permission condition during the idling of the engine and calculates the fuel injection quantity as the second injection parameter based on a change in the behavior of the engine output shaft caused by the entire fuel injections.

15. The engine control system as in claim 12, wherein
the fuel injection control device further including:
a first parameter storing means for storing a value of the first injection parameter acquired by the first parameter acquisition means in a predetermined storage device while relating the value to each situation defined by one or more contents of one or more specific parameters consisting of one or more predetermined parameters indicating each situation; and
a second parameter storing means for storing a value of the second parameter acquired by the second parameter acquisition means in a predetermined storage device while relating the value to each situation defined by the one or more contents of the one or more specific parameters.

16. The engine control system as in claim 15, wherein
the one or more specific parameters include an injection pressure level of the injector.

17. The engine control system as in claim 15, wherein
the first parameter acquisition means and the first parameter storing means preferentially store the first injection parameter for a first situation, in which an injection pressure level is higher than in a second situation, the first situation and the second situation being defined in accordance with a magnitude of the injection pressure level of the injector, and
the second parameter acquisition means and the second parameter storing means preferentially store the second injection parameter for the second situation.

18. The engine control system as in claim 17, wherein
the second parameter acquisition means and the second parameter storing means do not store the first injection parameter for the first situation.

19. The engine control system as in claim 17, wherein
the first parameter acquisition means and the first parameter storing means start storing the first injection parameter for the second situation based on establishment of a predetermined condition when the storage of the first injection parameter for the first situation is completed.

20. The engine control system as in claim 15, wherein
the fuel injection control device further including:
a diagnosing means for diagnosing existence/nonexistence of an abnormality in the injector based on the first injection parameter and the second injection parameter stored in the predetermined storage devices respectively by the first parameter storing means and the second parameter storing means.

21. The engine control system as in claim 12, wherein
the fuel injection controller further including.
an injection characteristic error derivation means for calculating an error of the fuel injection characteristic of the injector by comparing the first injection parameter acquired by the first parameter acquisition means or the second injection parameter acquired by the second parameter acquisition means with a corresponding reference value.

22. The engine control system as in claim 21, wherein the fuel injection controller further including:

a correction means for correcting the fuel injection characteristic of the injector based on the error of the fuel injection characteristic calculated by the injection characteristic error derivation means.

* * * * *